May 8, 1945.  H. KEELING ET AL  2,375,662
AUTOMATIC TAPPING ATTACHMENT
Filed Dec. 4, 1943  3 Sheets-Sheet 3

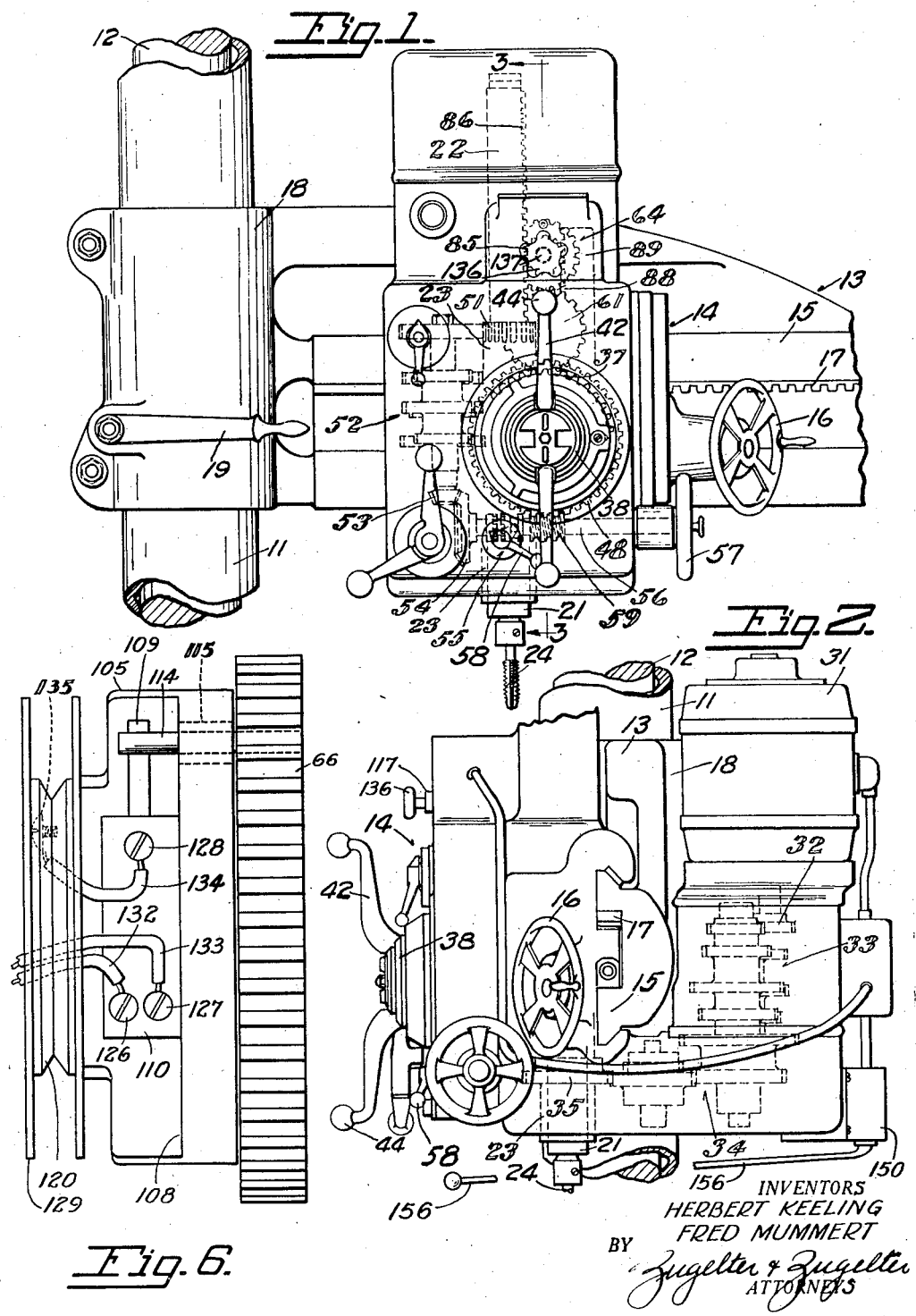

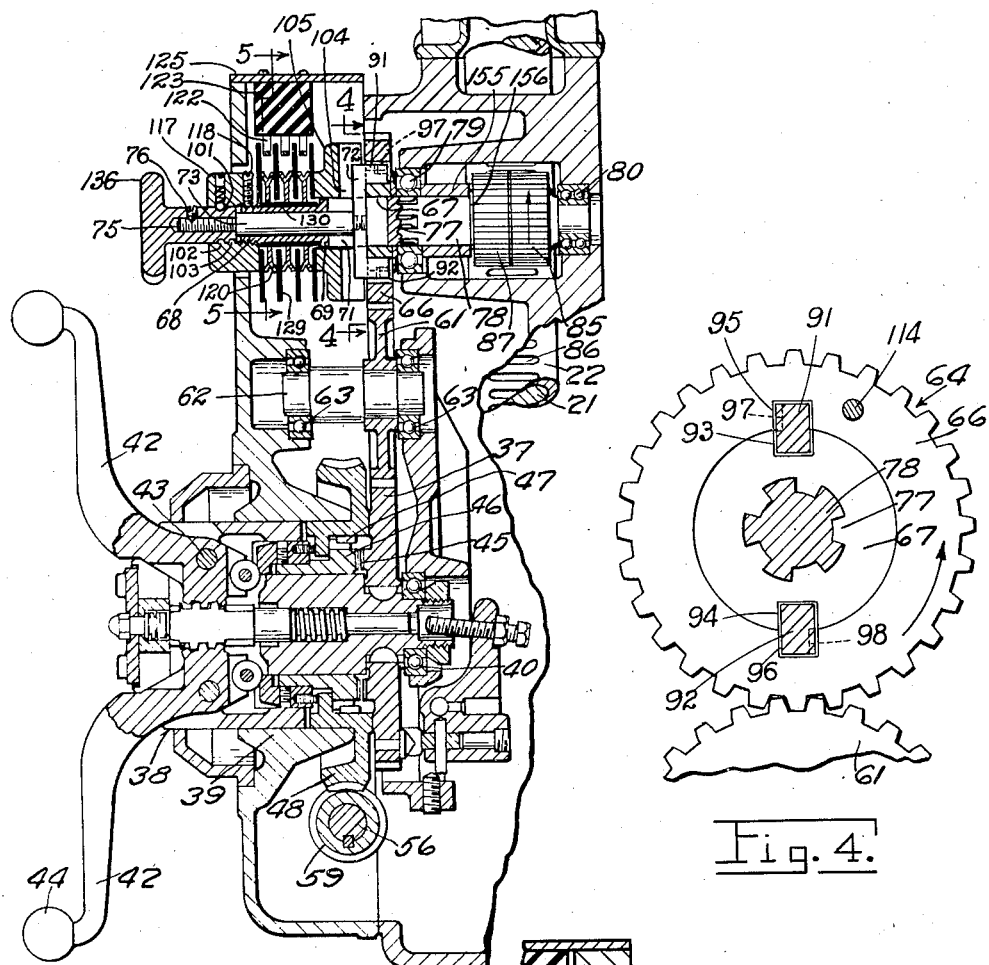

INVENTORS
HERBERT KEELING
BY  FRED MUMMERT
Zugelter & Zugelter
Atty's

Patented May 8, 1945

2,375,662

UNITED STATES PATENT OFFICE 2,375,662

AUTOMATIC TAPPING ATTACHMENT

Herbert Keeling and Fred Mummert, Cincinnati, Ohio, assignors to The Carlton Machine Tool Company, Cincinnati, Ohio, a corporation of Ohio Application December 4, 1943, Serial No. 512,988

16 Claims. (Cl. 10—136)

The invention relates to improvements in a machine for drilling and tapping holes in a work piece, or for forming threads upon a work piece by means of a tool such as a tap or threading die.

An object of the invention is to provide in a machine for the purpose stated, a simplified and convenient quickly responsive means for reversing the threading operation performed upon a work piece, with the result of facilitating and expediting production.

Another object of the invention is to provide a tool reversing mechanism in a machine of the character described, possessing the advantages of reducing the possibility of tool breakage, and relieving the machine operator of fatigue incident to operation of the machine.

A further object is to provide a tool reversing mechanism in a machine of the character stated, which is constituted of few and simple wearing parts of such character as to require infrequent servicing or replacements, thereby enhancing the efficiency of the machine and ensuring trouble-free operation for long periods of time.

Another object is to associate the tool reversing mechanism with other controls for the machine, in such manner as will simplify operation of the machine and eliminate separately manipulatable controls for said mechanism.

The foregoing and other objects are attained by means described herein and disclosed in the accompanying drawings, in which:

Fig. 1 is a front elevational view of a drilling and threading machine embodying the present invention, parts being broken away for clarity of disclosure.

Fig. 2 is an end view of the same as viewed from right to left, parts being broken away.

Fig. 3 is a fragmental cross-sectional view taken on line 3—3 of Fig. 1.

Fig. 4 is an enlarged cross-sectional view taken on line 4—4 of Fig. 3.

Fig. 5 is an enlarged cross-section taken on line 5—5 of Fig. 3.

Fig. 6 is a fragmental elevational view of the mechanism located between section lines 4—4 and 5—5 of Fig. 3.

Figure 7:
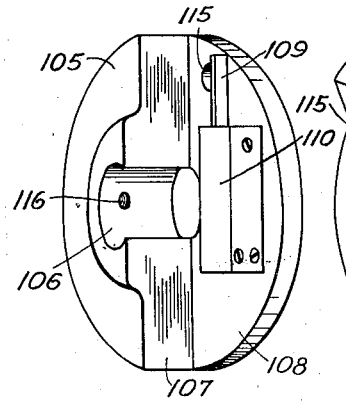
Fig. 7 is a perspective view of a reversing switch carrier member, showing the forward face thereof.

The invention is exemplified as applied in a drilling machine. The drilling machine may be of ordinary or usual construction, and may comprise a usual sleeve or column 11 rotatable about an upright post 12. An arm 13 is mounted on the column. A tool slide 14 is arranged to be moved laterally on the arm on guideways 15, as by means of a hand wheel 16 geared to the usual rack 17 on the arm parallel with the guideways. It is arranged to be clamped in suitable position upon the arm. The arm may be raised or lowered on the column and fixed in elevational position by clamping its bearing 18 about the column by a usual clamp operated by a clamp handle 19, and the column and arm may be clamped in adjusted radial positions about the post, with the arm above the work support or base at the bottom of the post, as is usual in machines of this character.

A usual rotatable tool spindle 21 and a rack-sleeve 22 thereabout are translatable up and down in the slide. The tool spindle is rotatably mounted in the rack-sleeve and is rotatable with a spindle sleeve 23, journaled in the slide, the spindle being splined to this latter sleeve in usual manner. The spindle is arranged to carry the usual tools, one of which is shown at 24 as a tapping or threading tool.

In the present exemplification there is a reversible electric motor 31 for rotating the tool spindle in reverse directions at various speeds. A train of speed changing gearing operated by a gear 32 on the rotor of the motor is indicated at 33, and a train of transmission gearing between it and the tool spindle sleeve 23 is exemplified at 34, including a gear 35 fixed to said sleeve.

Means are provided for translating the spindle in reverse directions, exemplified as comprising a gear 37, which is rotatable manually or by power, and is fixed so as to rotate with a head 38 rotatable in suitable bearings 39, 40 in the slide. Manually operated arms or handles 42 are pivoted on pivots 43 to the head and are provided with manipulating knobs 44 and are arranged to be moved radially outward for manual translation of the tool spindle and to be moved radially toward each other for connecting the power translating train with the spindle. Such inward radial movement of the arms engages a clutch 45 between a sleeve 46, rotatable with relation to the head and the gear 37.

The said sleeve has rotative connection by means of engaging clutch teeth 47 with a worm wheel 48 having releasable driven connection with the spindle for power translation of the spindle.

The power translating connection from the spindle is by means of a gear 51 formed on the sleeve 23, which drives a train of speed change gearing 52 for rotating a bevel pinion 53 at desirable speeds. The bevel pinion 53 meshes with the bevel gear 54. A usual clutch 55 connects the latter with a shaft 56 when it is desired to translate the spindle by power, the said clutch being released when it is desired to translate the spindle manually as by means of a hand wheel 57. The clutch is engaged or disengaged by a suitable handle 58.

The shaft 56 has a worm 59 thereon which meshes with the worm wheel 48, and is arranged to be rotated either by hand or by power when it is desired to translate the tool spindle by the hand wheel 57 or by the power train. When the tool spindle is translated manually by planetary movement of the arms 42, the clutch 55 is disengaged, so that rotation of the gear 37 is effected by means of the head 38 and without rotation of the worm wheel 48.

The power translation of the tool spindle may be controlled by suitable tappet and knock-out devices. Manual translation may be similarly controlled.

The parts thus far described are found in drilling machines as now commonly constructed, examples of which are shown and described in Letters Patent of the United States No. 1,638,654 granted to J. C. Carlton on August 9, 1927, and in the J. C. Carlton application Serial 105,054, filed October 10, 1936.

In the present exemplification of the invention, gear 37 meshes with a gear 61 on a shaft 62 journaled in bearings 63 in the slide. The gear 61 meshes with a multi-part transmitting element 64, exemplified as a gear having an outer toothed member 66 and an inner member 67. Idle movement or slight lost motion is provided for between these members, so that one may be rotated slightly relative to the other, between rather close limits, by rocking the gear 37 by means of control handles 42—42. Said idle movement may be selectively blocked, or eliminated from the transmitting element, by a push-pull manipulation of certain mechanism including knob or handle 136, the details of which will be described presently.

Referring to Fig. 3, the inner member 67 is shown as having spline connection 77 with a shaft 78, so as to rotate said shaft therewith. The shaft 78 is mounted in bearings 79—80 in the frame of the slide, and has a pinion 85 fast thereon to mesh with rack 86 on the sleeve 22, for translating the spindle in opposite directions and thereby feeding the tool into or out of a workpiece. Another pinion indicated at 87 is loose on the shaft and also meshes with said rack at one of its sides, the other sides of the pinions 85, 87 meshing with the rack 88 on a suitable counterweight 89 for counterbalancing the spindle, for instance as more clearly shown in the Carlton Patent No. 1,638,654.

Figure 9:
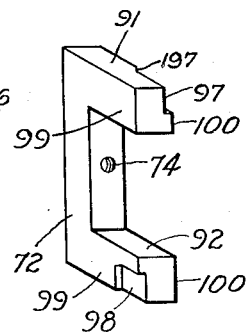
Fig. 9 is a perspective view of a lost-motion control dog, forming a detail of the invention.

Shaft 78 is turned down to provide a forward extension 68, externally threaded at its forward end, as indicated; and to the rear of the shaft shoulder 69 a transverse through slot 71 is milled or otherwise formed in said shaft. The lost-motion control dog 72, which is best illustrated by Figs. 3 and 9, is lodged in said slot 71 and may be moved bodily toward and from the member 67 of the multi-part transmitting element 64 by reciprocating the dog shifter rod 73. This rod has its inner end screw threaded into the threaded bore 74 of the control dog, or may be in any other suitable manner fixed thereto. The outer end 75 of the rod may be threaded to threadedly engage the shank of knob or handle 136, positive fixation of these parts being assured by providing the set screw 76. Thus it will be evident that the dog 72, rod 73, and knob 136 may be reciprocated unitarily in directions lengthwise of the rod.

As is best illustrated by Figs. 3, 4 and 9, the control dog 72 is provided with a pair of legs 91, 92 extending in parallelism with the shiftable rod 73, said legs being received in notches 93, 94 of the member 67, and in corresponding notches or transverse ways 95, 96 formed in the outer gear member 66. The legs 91, 92 of the dog accordingly will be seen to furnish a means of locking the members 67 and 66 against relative rotation, at least when the legs are fully projected into said members. However, should the dog be partially retracted by pulling outwardly the knob 136, the outer gear member 66 will be permitted a slight rotational movement relative to the inner member 67, by an amount that the legs 91 and 92 of the dog are cut away or reduced in thickness at the recesses 97 and 98. In other words, the full thickness of the legs 91 and 92 normally will take up all the space in notches or ways 93, 94, 95 and 96, to key the members 66 and 67 against relative rotation; whereas retraction of the dog to the extent of placing the dog leg recesses 97 and 98 in registry with notches 95 and 96 of the outer gear member 66, serves to allow slight rotation of the outer member a few degrees, or a distance corresponding to the depth of recesses 97 and 98 (Fig. 4). The parallel side walls of the notches or ways 93, 94, 95 and 96, therefore, provide abutments bearing against the opposite side faces 99 and 100 of the legs of the control dog, when the dog is advanced; however, when the dog is partly retracted, one parallel side wall of each notch or way 95, 96, will seat within a dog leg recess, the effect of which is to allow slight rotation of the outer gear member 66 relative to inner member 67, as if the legs of the dogs were thinner than the width of notches 95 and 96. As a matter of fact, the legs of the dogs are thinner at their ends, (see Fig. 9). However, full thickness is maintained where the dog legs contact the side walls of the notches or ways 93 and 94 of the inner transmission member 67.

As previously stated, the dog is bodily shiftable with the longitudinally reciprocable rod or shaft of knob 136, limited by a spring pressed ball in collar 117, that may drop into either of the annular grooves 102, 103 in the hub of the knob, (Fig. 3). The collar may be fixed upon shaft 78 by means of a set screw 118. Shiftability of the dog to the advanced position is facilitated by sloping or inclining the base end of one or both of the recesses 97—98, as indicated at 197 in Fig. 9.

Figure 8:
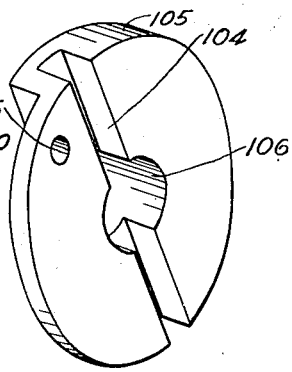
Fig. 8 is a similar view showing the rear face of the carrier member illustrated by Fig. 7.

Referring to Figs. 8 and 9, it should be understood that the transverse body or leg connecting portion of the dog seats within a diametral channel 104 of a tapping switch carrier disc 105, opposite faces of which are illustrated by Figs. 7 and 8. The dog never leaves this channel, although it may reciprocate therein axially of the disc, as knob 136 is manipulated, (Fig. 3).

The tapping switch carrier disc or member 105 has a central bore 106 extending through it from front to rear. The rear side or face carries the channel 104, and the front side or face is provided with a step 107 adjacent to which is an offset mounting area 108 for the attachment of a so-called micro-switch, which in this instance is single-pole, double-throw. The switch referred to is well known, and for that reason needs not be described in detail, though it may be stated that the micro-switch is characterized by its small size and its high sensitivity to slight movement of the actuator arm 109, that extends from the casing 110 of the switch. The contacts of the micro-switch are yieldingly biased to a closed-circuit condition, (Fig. 10) at which the main drive motor 31 operates in a "forward" direction of rotation, that is, the direction necessary for drilling holes in a workpiece. By applying lateral force to the switch actuator arm in one direction, a comparatively small amount of movement of the arm may be induced, which is sufficient to unbias the switch, for opening the normally closed contact 112 and closing the contact 133, thereby reversing the phasing of current to the main drive motor and causing the latter to rotate in the reverse direction, with reversal of the tool spindle accordingly.

The slight movement necessary to unbias the micro-switch 110 may be obtained by means of a pin or stud 114, (Figs. 4, 5 and 6) which is anchored in the outer gear member 66 to extend through an enlarged opening 115 in the switch carrier member, as shown in Figs. 6, 7, 8 and 5. The opening 115 is made sufficiently large to permit freedom of movement of pin 114 toward and from the switch actuator arm 109, the pin moving the switch arm to the right, as viewed in Fig. 5, for reversing the direction of current flow to the main drive motor by way of contacts 113. The pin is not shown on Fig. 3, as it is located to one side of the section line, but it will be understood to extend from gear member 66 to the left, and through disc 105, as explained above and best illustrated by Fig. 6.

From the foregoing, it will be evident that slight relative rotation of outer gear member 66 (Fig. 4), relative to the inner member 67, will cause pin 114 to strike the reversing switch actuator arm and thereby cause reversal of the main drive motor and the spindle associated therewith. Such movement of the pin 114 is possible only when the control dog is partly retracted from the transmission device of Fig. 4, to present the recesses 97 and 98 to the side walls of notches or ways 95 and 96. When the control dog is projected fully into the notches or ways, the constituent parts 66 and 67 of the transmission device are securely locked against relative rotation, for then the legs of the dog are snugly received in the notches and idle movement is eliminated. Without idle movement in these parts, the pin cannot be advanced into contact with the switch actuator, wherefore, the switch will remain biased for ensuring a forward or normal direction of rotation of the main drive motor.

The tapping switch carrier disc may be held fast to shaft 78 in any suitable manner, such as by means of a set screw driven through the threaded bore 116 of the disc, (Fig. 7).

The necessary electrical connections to the automatic tapping switch 110 are made through a series of metallic contact discs 120 arranged coaxially upon the reduced end of shaft 78, said discs having grooved peripheries as shown, to accommodate an equal number of conductors or brushes 121 carried by the free ends of spring arms 122 anchored to a brush terminal block 123 at the location 124. The terminal block is fixed to the frame of the machine, or to a cover element 125. Under the present wiring arrangement, the automatic tapping switch requires three electrical connections 126, 127 and 128, and to accommodate these connections three contact discs and brushes are employed.

The several discs 120 are insulated from shaft 78 by means of an insulator sleeve 130 that surrounds the shaft, and electrical communication between discs is precluded by the use of a series of insulator discs 129. Thus, the metallic contact discs are completely insulated from one another and from the structure that supports them. The brushes likewise are electrically independent of one another and each cooperates with a contact disc to convey electric current to and from the switch 110.

The alternate contact discs and insulator discs are clamped together, between member 105 and collar 117 so as to provide a unitary structure rotatable with shaft 78. The brushes, of course, are stationary and are adapted to ride upon the peripheries of the metallic contact discs as the discs rotate with the shaft 78 during translation of the spindle.

In order that the several terminals of switch 110 may be electrically strapped to their corresponding contact discs, said discs may be perforated as indicated at 131 of Fig. 5, the insulator discs likewise being perforated, in order that the insulation covered conductors or straps 132, 133 and 134 may be threaded through the various discs to reach the binding screw 135 carried by each of the metallic contact discs.

As will be understood, each disc 120 is furnished with a binding screw or anchorage means for the permanent attachment of a short conductor or strap leading to the switch 110. The contact discs referred to are illustrated conventionally upon the wiring diagram of Fig. 10, and their connection with the switch 110 is likewise indicated.

With further reference to the wiring diagram, the main line wires are indicated at 137, 138 and 139, and these supply current to the main drive motor 31, whose direction of rotation is controllable by forward and reverse switches indicated schematically by the characters 140 and 141.

Figure 10:
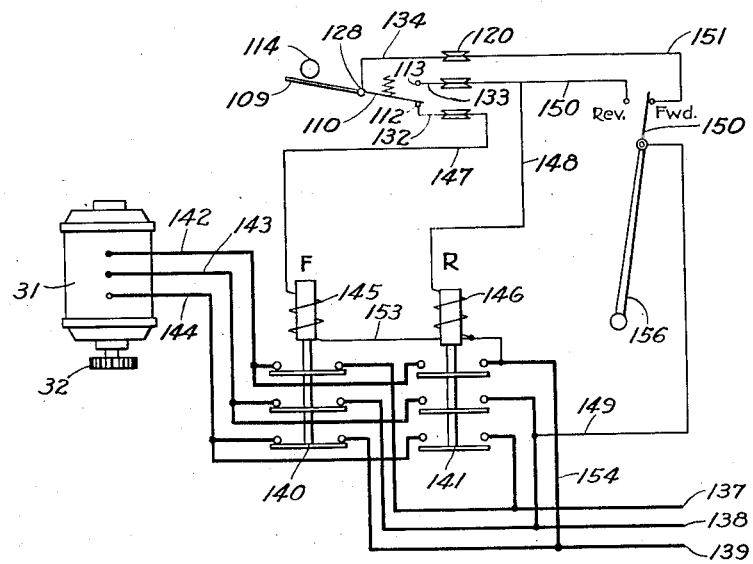
Fig. 10 is a diagrammatical representation of a wiring diagram.

By means of switches 140 and 141, reversal of phase of current to the motor 31 is effected through the leads 142, 143 and 144. The switches may be magnetically operated through the agency of coils 145 and 146 acting upon the armatures encircled thereby as shown. Energization of the magnetic means 145 and 146 may be selectively effected automatically by the tapping switch 110, which is capable of initiating a closed circuit through coil 145 by way of conductor 147, or through coil 146 by way of conductor 148, depending upon the position to which the movable contact of switch 110 is thrown by arm 109 thereof. As seen in Fig. 10, electric current is supplied to motor 31 through the forward magnetic switch 140, by reason of a flow of current from line wire 138, to conductor 149, manual switch 150, conductor 151, disc 120, strap 134, contact 128 of switch 110, conductors 132 and 147, coil 145, and conductors 153 and 154, to line wire 139. If the automatic tapping switch be thrown to the reverse position by the action of pin 114, the current flow would be from line wire 138, through conductors 149, 150, 151, 120, 134, 128, 113, 133, 148, 146, 154 and 139, to reverse the drive of motor 31 through magnetic switch 141.

Attention is now directed to the manual switch 150, shown on the wiring diagram of Fig. 10, and located upon Fig. 2 for manual control by a lever 156 placed upon the machine at a convenient location. The purpose of this switch is to enable the machine operator to reverse the drive of motor 31 at will, and independently of the automatic tapping switch 110. Inasmuch as tapping switch 110 has no neutral position, and normally maintains a closed circuit in the forward position, the manual switch 150 may at any time be manipulated to direct a current of electricity to either one of the magnetic switches 140 or 141, as the operator may elect. The manual switch 150 may have also a neutral or open circuit position, if desired, so that it may be used for manually controlled tapping operations, for drilling operations, or for other operations ordinarily performed upon a drilling machine. The circuit above described is illustrated in the simplest form possible, but in actual practice it is desirable to incorporate therein, in accordance with common practice, various safety devices such as overload and undervoltage equipment for the protection of the electrical system of the machine, as well as for the protection of the operator and the mechanical elements of the machine. These safety devices and the like are omitted from the present disclosure, as they form no part of the invention herein set forth, and for the further reason that they can be installed by any skilled electrician if necessary or desirable.

Manual switch 150 may have an intermediate neutral position, between the forward and reverse positions, for breaking the main motor control circuit; or if desired, a separate switch may be provided for the purpose. As herein shown, the manual switch 150 may perform this function.

In operation, in employing the tapping mechanism and translating control for reversal of rotation of the tool spindle, the knob 136 is withdrawn or pulled outwardly in order to retract the dog 72 and thereby allow for slight relative rotational movement of the outer and inner members 66 and 67 of the pluri-part transmitting element 64, as previously explained. The automatic tapping switch 110 will be in position to establish forward rotation of the main drive motor 31, as illustrated by Fig. 10, and at the same time the manual switch 150 will be closed in the forward position. The tapping tool 24 will thereby be rotated in the forward direction for cutting the thread and feeding the tool into the work. The work having been secured on a suitable support under the drill arm, the drill arm or the tool slide, or both, are shifted as by bearing upon or rotating the hand wheel 16, to locate the tapping tool in line with the hole to be tapped in the work, the handles 42 having been moved outwardly radially to full extent and locked in usual manner in such position on the head 38. The operator grasps the handles and moves them planetwise to the left, for advancing the tool toward the work. By applying sufficient force at the instant of contact of the tool with the work, the operator in manipulating the handles 42 causes the tapping tool to begin the tapping operation. This results in rotating the pinion 85 in the direction of the arrow imposed thereon in Fig. 3, and rotates others of the parts as indicated by arrows. The threads of the tool thereupon feed the tool axially into the work according to the lead of the tool thread, the operator preferably continuing to move the arms 42 planetwise with just sufficient speed to relieve the feeding force of the tap upon the work. During this operation the faces 97 and 98 of the dog are spaced from the adjacent faces of the notches 95 and 96, in the outer member 66 of the transmission element. (Fig. 4).

Proper feeding movement by the operator is ensured by the fact that if he allows such movement to materially lag, thus placing the tool preponderantly under the feeding influence of the tap, the inner member 67 will rotate faster than the outer member 66, causing the dog recesses 97 and 98 to approach the adjacent faces of notches 95 and 96 in the outer member 66. If such approach becomes substantial, the pin 114 will strike the reversing switch actuator 109 and thereby automatically result in reversal of motor 31, and of the rotation of the tool spindle, causing automatic retraction of the tool from the work. This retraction is not detrimental to the work, but is rather on the side of safety, since by such operation of the drive of the device the operator is quickly informed as to the desired feed by him of the tool. The feed rate required on the part of the operator to prevent such reversal of the tool, is soon adopted by the operator for properly supplementing the feeding impulses of the tool by his manual feeding, for relieving the tool of undesirable feeding friction and of all duty except its cutting function, thereby materially improving the quality of the work and increasing the speed of operation.

The operator can readily feel reaction upon the handles 42, if he feeds the tool into the work too rapidly, due to resultant friction between the tool and the work. He soon finds that the easiest feeding movement is the proper feeding speed, and is governed thereby in his traversing feeding movement of the tool. When the tapping tool has been fed to sufficient depth into the work, as determined by feel, sound, or sight on the part of the operator, or by automatic stops suitably placed, the operator suddenly reverses the planetwise movement of the handles 42, thereby deliberately rotating the outer member 66 relative to inner member 67 of the transmission element, and causing pin 114 to actuate the reversing switch 110, to reverse the main drive motor 31. The operator in the meantime continues his reverse planetwise movement of the handles 42, rendering reverse feeding force by the operator effective upon actual reversal of rotation of the tool, supplementing the withdrawing movement occasioned by the spirality of the cutting wings of the tool in the threads which have been cut.

During such withdrawal movement, the operator maintains contact of the pin 114 upon the actuator arm 109 of switch 110, in order to continue the withdrawal of the tool from the work. Should the operator lag with his reverse translating movement of the tool, pin 114 will leave the switch actuating lever and thereby permit the switch contact to return to the forward position of contact, causing the motor to again reverse and drive the tool into the work. Such reentry of the tool, however, is idle and will cause no damage, as its spiral cutting wings merely move idly in the spiral grooves of the thread previously cut in the work. The operator quickly learns the proper speed at which to withdraw the tool complementarily to the speed of withdrawal movement established by spirality of the cutting wings of the tool, so as to withdraw the tool relieved of frictional contact with the work, thereby materially enhancing the quality of the work and increasing the speed of operation.

In order to neutralize the tapping mechanism, it is necessary only to push inwardly the knob 136, thereby to advance the legs 91 and 92 of the dog fully into the notches of the inner and outer transmission members 66 and 67, so that said members may not rotate relatively to one another. With the members 66 and 67 so locked together, the stationary pin 114 of member 66 cannot approach the actuating lever of the reversing switch 110. The spindle accordingly will be driven in the forward direction, without possibility of reversal automatically.

The arrangement described permits the drilling machine to be operated for all usual operations, such as drilling and ordinary threading and other operations for which a drilling machine is ordinarily employed. In ordinary operations, exclusive of automatic tapping, the forward and reverse switch 150 may be employed for the control of the machine, while the automatic reversing switch 110 remains in the normal forward position with its contacts closed to complete the electrical circuit to motor 31 for forward rotation thereof.

The device of this invention is highly sensitive in its reaction to planetary movement of the handles 42 and the operator senses very quickly what is the proper speed for supplemental spindle translation both in cutting and in tool withdrawing directions. A great many holes in a piece of work may be quickly tapped by the improved device of this invention, with a minimum number of motions required of the operator. Thus the operator may grasp one of the handles 42 with one hand, while grasping the hand wheel 16 with the other hand, to accomplish the translating movements of the tool in either direction. He may set the slide to a new position by manipulating the handle 16 for tapping the next hole, in sequence for repeated holes, without other manipulation of parts.

While a preferred embodiment of the invention has been illustrated and described herein, it is to be understood that various changes and modifications may be made in structural details of the device, within the scope of the appended claims, without departing from the spirit of the invention.

What is claimed is:

1. The combination of a tool spindle, means for rotating the spindle in reverse directions, comprising a reversible spindle driving means and electrical control means for said driving means, translating means for translating said tool spindle in reverse directions, including a manually operable spindle feeding member and a shaft rotated thereby, the shaft being rotatable in opposite directions by said manually operable member and having translatory connection with the spindle, a multi-part transmission device on the shaft comprising a member fast on the shaft, and a second member rotatable relative to the shaft, a push-pull device including a dog reciprocable toward and from the members of the transmission device for selectively locking said members together for unitary rotational movement imparted thereto by the manually operable member aforesaid, and means responsive to relative movements of the members of the transmission device as established by the reciprocable dog of the push-pull device, for actuating the electrical control means of the reversible spindle driving means, to reverse the spindle rotation.

2. The combination of a tool spindle, means for rotating the spindle in reverse directions, comprising a reversible spindle driving means and electrical control means for said driving means, translating means for translating said tool spindle in reverse directions, including a manually operable spindle feeding member and a shaft rotated thereby, the shaft being rotatable in opposite directions by said manually operable member and having translatory connection with the spindle, a multi-part transmission device on the shaft comprising a member fast on the shaft, and a second member rotatable relative to the shaft, a push-pull device including a dog reciprocable toward and from the members of the transmission device for selectively locking said members together for unitary rotational movement imparted thereto by the manually operable member aforesaid, and means responsive to relative movements of the members of the transmission device as established by the reciprocable dog of the push-pull device, for actuating the electrical control means of the reversible spindle driving means, to reverse the spindle rotation, the dog when moved to position for locking together the members of the transmission device serving to preclude actuation of the electrical control means by the manually operable member aforesaid.

3. The combination of a tool spindle, means for rotating the spindle in reverse directions, comprising a reversible spindle driving means and electrical control means for said driving means, translatory means for translating said tool spindle in reverse directions, including a manually operable spindle feeding member and a shaft rotated thereby, the shaft being rotatable in opposite directions by said manually operable member and having translatory connection with the spindle, a multi-part transmission device on the shaft comprising a member fast on the shaft, and a second member movable relative to the shaft, means for selectively locking the last mentioned members together, and for unlocking them for limited relative movement, electricity conducting means including a series of electrically independent contact discs fixedly mounted relative to the shaft carrying the multi-part transmission device, a carrier for said electrical control means mounted upon the shaft for rotation with the contact discs, means carried by one of the members of the transmission device for actuating the electrical control means only upon limited relative movement of the transmission device members as established by the selective locking means aforesaid, said actuating means being rendered ineffective to actuate the electrical control means when the transmission device members are locked against relative movement, electrical connections between the control means and the contact discs, and an electrical circuit including said connections, the control means, a source of electricity, and the reversible spindle driving means, arranged to reverse the direction of said driving means upon each actuation of said control means.

4. The combination of a tool spindle, means for rotating the spindle in reverse directions, comprising a reversible spindle driving means and electrical control means for said driving means, translatory means for translating said tool spindle in reverse directions, including a manually operable spindle feeding member and a shaft rotated thereby, the shaft being rotatable in opposite directions by said manually operable member and having translatory connection with the spindle, a multi-part transmission device on the shaft comprising a member fast on the shaft, and a second member rotatable relative to the shaft, means for selectively locking the last mentioned members together, and for unlocking them for limited relative rotation, electricity conducting means including a series of electrically independent contact discs fixedly mounted relative to the shaft carrying the multi-part transmission device, a carrier for said electrical control means mounted upon the shaft for rotation with the contact discs, means carried by one of the members of the transmission device for actuating the electrical control means only upon limited relative rotation of the transmission device members as established by the selective locking means aforesaid, said actuating means being rendered ineffective to actuate the electrical control means when the transmission device members are locked against relative rotation, electrical connections between the control means and the contact discs, and an electrical circuit including said connections, the control means, a source of electricity, and the reversible spindle driving means, arranged to reverse the direction of said driving means upon each actuation of said control means.

5. The combination of a tool spindle, means for rotating the spindle in reverse directions, comprising a reversible spindle driving means and electrical control means for said driving means, means for translating the spindle in reverse directions, including a manually operable spindle feeding member and a shaft rotatable thereby in opposite directions, said shaft having translatory connection with the spindle, a multi-part transmission device on the shaft comprising a member fast on the shaft, and a second member movable relative to the first member, a push-pull device including a dog reciprocable toward and from said first and second members for selectively locking the members together, and for unlocking them to limited relative movement, electricity conducting means including a series of electrically independent contact discs fixedly mounted relative to the shaft, a carrier for said electrical control means mounted upon the shaft for rotation with the contact discs, means carried by the second member of the transmission device for actuating the electrical control means only upon limited relative movement of the transmission device members as established by the selective locking action of the push-pull device, said actuating means being rendered ineffective to actuate the electrical control means when the transmission device members are locked by the dog against relative movement, electrical connections between the control means and the contact discs, and an electrical circuit including said connections, the control means, a source of electricity, and the reversible spindle driving means, arranged to reverse the direction of said driving means upon each actuation of said control means.

6. The combination of a tool spindle, means for rotating the spindle in reverse directions, comprising a reversible spindle driving means and electrical control means for said driving means, said control means including a switch actuatable for reversing the direction of spindle rotation, means for translating the spindle in reverse directions, including a manually operable spindle feeding member and a hollow shaft rotatable thereby in opposite directions, means providing translatory connection between said shaft and spindle, a multi-part transmission device on the shaft comprising a member fast on the shaft, and a second member rotatable relative to the first member, a dog reciprocable axially of the shaft toward and from the transmission device, cooperative means on the dog and on the members of the transmission device, for locking said members together against relative rotation when the dog is reciprocated in one direction, and for unlocking said members to limited relative rotation when the dog is reciprocated in the opposite direction, a reciprocable rod extending through the hollow shaft and having on one end a handle, the opposite end of the rod being fixed to the dog for reciprocation therewith as the handle is reciprocated, a switch carrier rotatable with the shaft, and means located on one of the transmission device members in position to actuate the switch only when said members are rotated relatively as stated, to initiate reversal of spindle rotation.

7. The combination of a tool spindle, means for rotating the spindle in reverse directions, comprising a reversible spindle driving means and electrical control means for said driving means, said control means including a switch actuatable for reversing the direction of spindle rotation, means for translating the spindle in reverse directions, including a manually operable spindle feeding member and a hollow shaft rotatable thereby in opposite directions, means providing translatory connection between said shaft and spindle, a multi-part transmission device on the shaft, comprising a member fast on the shaft, and a second member rotatable relative to the first member, a dog reciprocable axially of the shaft toward and from the transmission device, cooperative means on the dog and on the members of the transmission device, for locking said members together against relative rotation when the dog is reciprocated in one direction, and for unlocking said members to limited relative rotation when the dog is reciprocated in the opposite direction, a reciprocable rod extending through the hollow shaft and having on one end a handle, the opposite end of the rod being fixed to the dog for reciprocation therewith as the handle is reciprocated, a switch carrier rotatable with the shaft, means located on one of the transmission device members in position to actuate the switch only when said members are rotated relatively as stated, to initiate reversal of spindle rotation, and a series of electrical contact members on the shaft and having electrical connection with the switch and the electrical control means associated therewith.

8. In a device for selective control of an electrical circuit, the combination which comprises a housing, a shaft supported upon the housing for rotation, a transmission device including a member fast on the shaft, and a second member rotatable relative to the shaft, means driving one of said members to effect rotation of the shaft, a clutch element reciprocable axially of the shaft toward and from the transmission device members, cooperative means on the clutch element and on the transmission device members for locking said members together against relative rotation when the clutch element is reciprocated in one direction, and for selectively unlocking said members to limited relative rotation when the clutch element is reciprocated in the opposite direction, an electric switch adapted to close one or another of a plurality of electric circuits, said switch being biased to normally maintain a closed circuit condition for one of said circuits, mounting means for the switch comprising a carrier fixed for rotation with the shaft aforesaid, said switch including an actuator, and means located on one of the transmission device members in position to move the switch actuator only upon relative rotation of the transmission device members as stated, to open the normal circuit of the switch and to close another circuit thereof.

9. In a device for selective control of an electrical circuit, the combination which comprises a housing, a shaft supported upon the housing for rotation, a transmission device including a member fast on the shaft, and a second member rotatable relative to the shaft, means driving one of said members to effect rotation of the shaft, a clutch element reciprocable axially of the shaft toward and from the transmission device members, cooperative means on the clutch element and on the transmission device members for locking said members together against relative rotation when the clutch element is reciprocated in one direction, and for selectively unlocking said members to limited relative rotation when the clutch element is reciprocated in the opposite direction, an electric switch adapted to close an electrical circuit, mounting means for the switch comprising a carrier fixed for rotation with the shaft aforesaid, said switch including an actuator, and means located on one of the transmission device members in position to move the switch actuator only upon relative rotation of the transmission device members as stated.

10. In a device for selective control of an electrical circuit, the combination which comprises a housing, a shaft supported upon the housing for rotation, a transmission device including a member fast on the shaft, and a second member rotatable relative to the shaft, means driving one of said members to effect rotation of the shaft, a clutch element reciprocable axially of the shaft toward and from the transmission device members, cooperative means on the clutch element and on the transmission device members for locking said members together against relative rotation when the clutch element is reciprocated in one direction, and for selectively unlocking said members to limited relative rotation when the clutch element is reciprocated in the opposite direction, an electric switch adapted to close an electrical circuit, mounting means for the switch comprising a carrier fixed for rotation with the shaft aforesaid, said switch including an actuator, and means located on one of the transmission device members in position to move the switch actuator only upon relative rotation of the transmission device members as stated, a series of electricity conducting brushes supported by the housing, and means for electrically connecting said brushes with the switch, comprising a series of independently electrically insulated collector discs on the shaft in contact with said brushes.

11. The combination of a tool spindle, means for rotating the spindle in reverse directions, comprising a reversible spindle driving means and electrical control means for said driving means, means for translating said tool spindle in reverse directions, including a manually operable spindle feeding member, and a transmission device for transmitting motion of said manually operable member to said spindle, said transmission device comprising a pair of members lockable relatively to one another, means to relax the locked condition of said members to the extent of permitting slight relative rotation thereof, and means responsive to the slight relative rotation of said members, to actuate the electrical control means of the spindle driving means for reversing the spindle rotation.

12. The combination of a tool spindle, means for rotating the spindle in reverse directions, comprising a reversible spindle driving means and electrical control means for said driving means, means for translating said tool spindle in reverse directions, including a manually operable spindle feeding member, and a transmission device for transmitting motion of said manually operable member to said spindle, said transmission device comprising a pair of members lockable relatively to one another, a bodily reciprocable clutching element including means to relax the locked condition of said members to the extent of permitting slight relative rotation thereof, and means responsive to the slight relative rotation of said members, to actuate the electrical control means of the spindle driving means for reversing the spindle rotation.

13. In a device for selective control of an electrical circuit, the combination which comprises a housing, a shaft rotatably supported upon the housing against longitudinal shifting movement, a transmission device including an inner member fast on the shaft, and an outer gear member rotatable about and in parallelism with the inner member, means for driving said outer gear member, a clutch element reciprocable axially of the shaft toward and from said transmission device members, cooperative means on the clutch element and on the transmission device members for locking said members together against relative rotation when the clutch element is axially moved in one direction along the shaft, and for partially unlocking said members for limited relative rotation upon movement of the clutch element in the opposite direction, an electric switch to control an electrical circuit, mounting means for the switch comprising a carrier fixed for rotation with the shaft aforesaid, said switch including an actuator, and means located on one of the transmission device members in position to move the switch actuator for control of the switch only upon limited relative rotation of said members as stated.

14. In a device for selective control of an electrical circuit, the combination which comprises a housing, a shaft supported upon the housing for rotation, a transmission device including a member fast on the shaft, and a second member rotatable relative to the shaft, means driving one of said members to effect rotation of the shaft, a clutch element reciprocable axially of the shaft toward and from the transmission device members, cooperative means on the clutch element and on the transmission device members for locking said members together against relative rotation when the clutch element is reciprocated in one direction, and for selectively unlocking said members to limited relative rotation when the clutch element is reciprocated in the opposite direction, an electric switch adapted to control an electrical circuit, mounting means for the switch comprising a carrier fixed for rotation with the shaft aforesaid, said switch including an actuator, and means located on one of the transmission device members in position to move the switch actuator only upon relative rotation of the transmission device members as stated, a series of stationary electricity conducting brushes, and means for electrically connecting said brushes with the switch.

15. The combination of a tool spindle, means for rotating the spindle in reverse directions, comprising a reversible spindle driving means and electrical control means for said driving means, translating means for translating said tool spindle in reverse directions, including a manually operable spindle feeding member and a shaft rotated thereby, the shaft being rotatable in opposite directions by said manually operable member and having translatory connection with the spindle, a multipart transmission device on the shaft comprising a member fast on the shaft, and a second member rotatable relative to the shaft, a push-pull device including a dog reciprocable toward and from the members of the transmission device for selectively locking said members together for unitary rotational movement imparted thereto by the manually operable member aforesaid, an actuator for the electrical control means fixed for movement with said second member of the multi-part transmission device, and means mounting the electrical control means for movement bodily with said shaft, the mountings of the electrical control means and of the actuator therefor being so located that said control means can be influenced by the actuator only in the unlocked condition of the transmission device members.

16. The combination of a tool spindle, means for rotating the spindle in reverse directions, comprising a reversible spindle driving means and electrical control means for said driving means, translating means for translating said tool spindle in reverse directions, including a manually operable spindle feeding member and a shaft rotated thereby, the shaft being rotatable in opposite directions by said manually operable member and having translatory connection with the spindle, a multi-part transmission device on the shaft comprising a member fast on the shaft, and a second member rotatable relative to the shaft, a push-pull device including a dog reciprocable toward and from the members of the transmission device for selectively locking said members together for unitary rotational movement imparted thereto by the manually operable member aforesaid, an actuator for the electrical control means fixed for movement with said second member of the multi-part transmission device, and means mounting the electrical control means for movement bodily with said shaft, the mountings of the electrical control means and of the actuator therefor being so located that said control means can be influenced by the actuator only in the unlocked condition of the transmission device members, and gear teeth on said second member of the multi-part transmission device, for effecting the drive between the shaft and the manually operable spindle feeding member.

HERBERT KEELING.
FRED MUMMERT.